Figure 1:
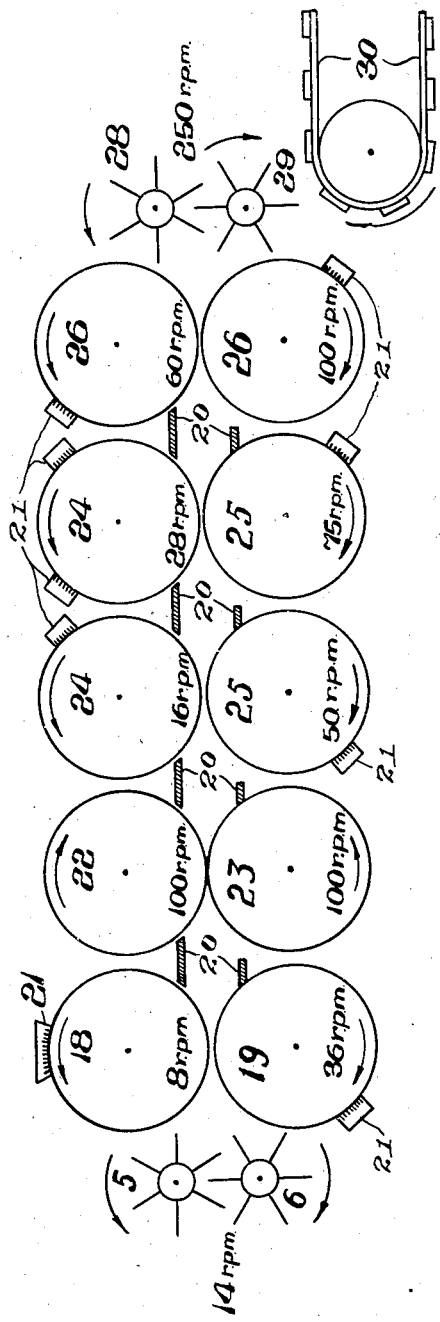

Aug. 15, 1944.   D. E. PATTERSON   2,355,999
PROCESS FOR DECORTICATING RAMIE, AND OTHER BAST FIBERS
Original Filed Feb. 20, 1941    3 Sheets-Sheet 1

INVENTOR
DAVID E. PATTERSON
BY
ATTORNEY

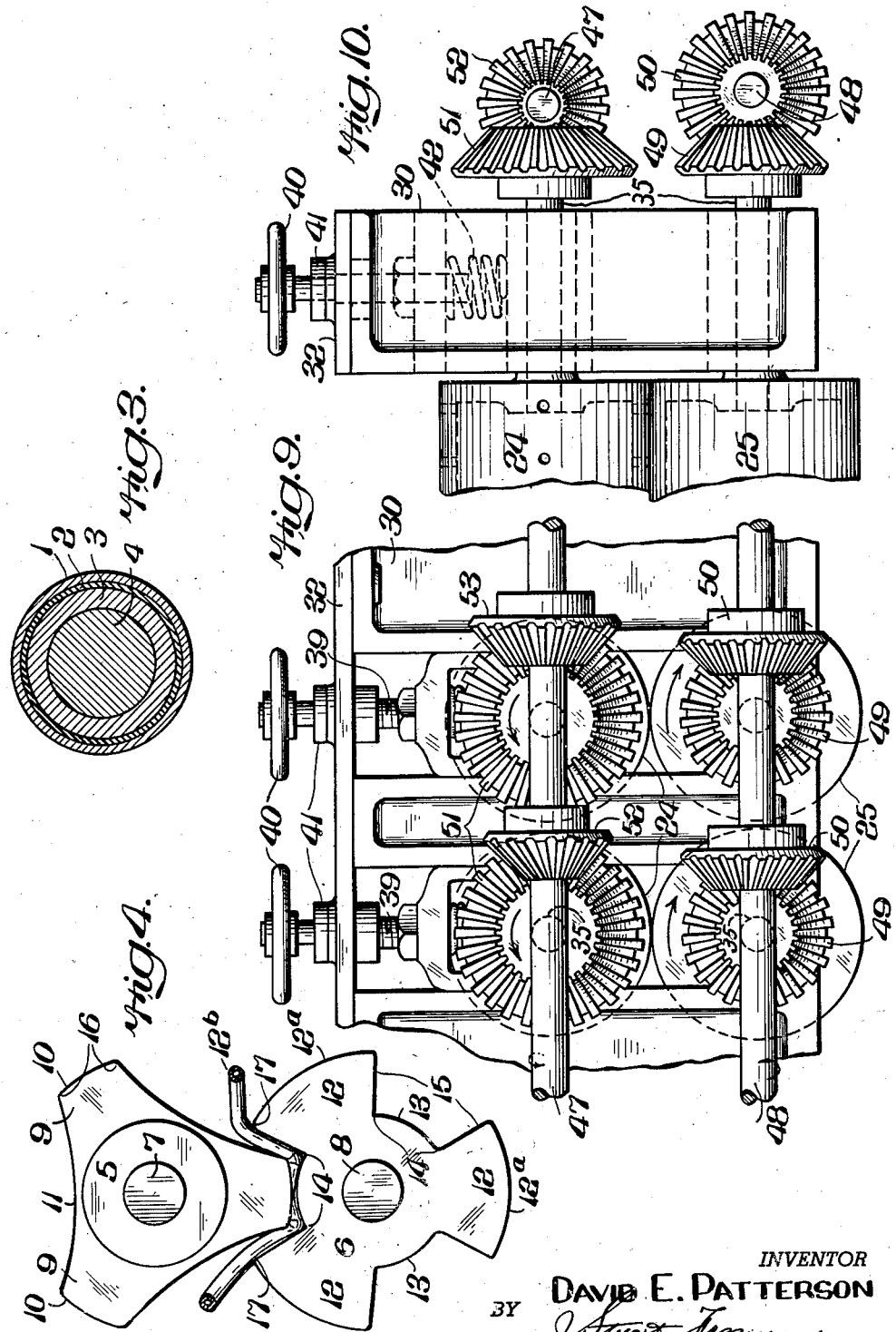

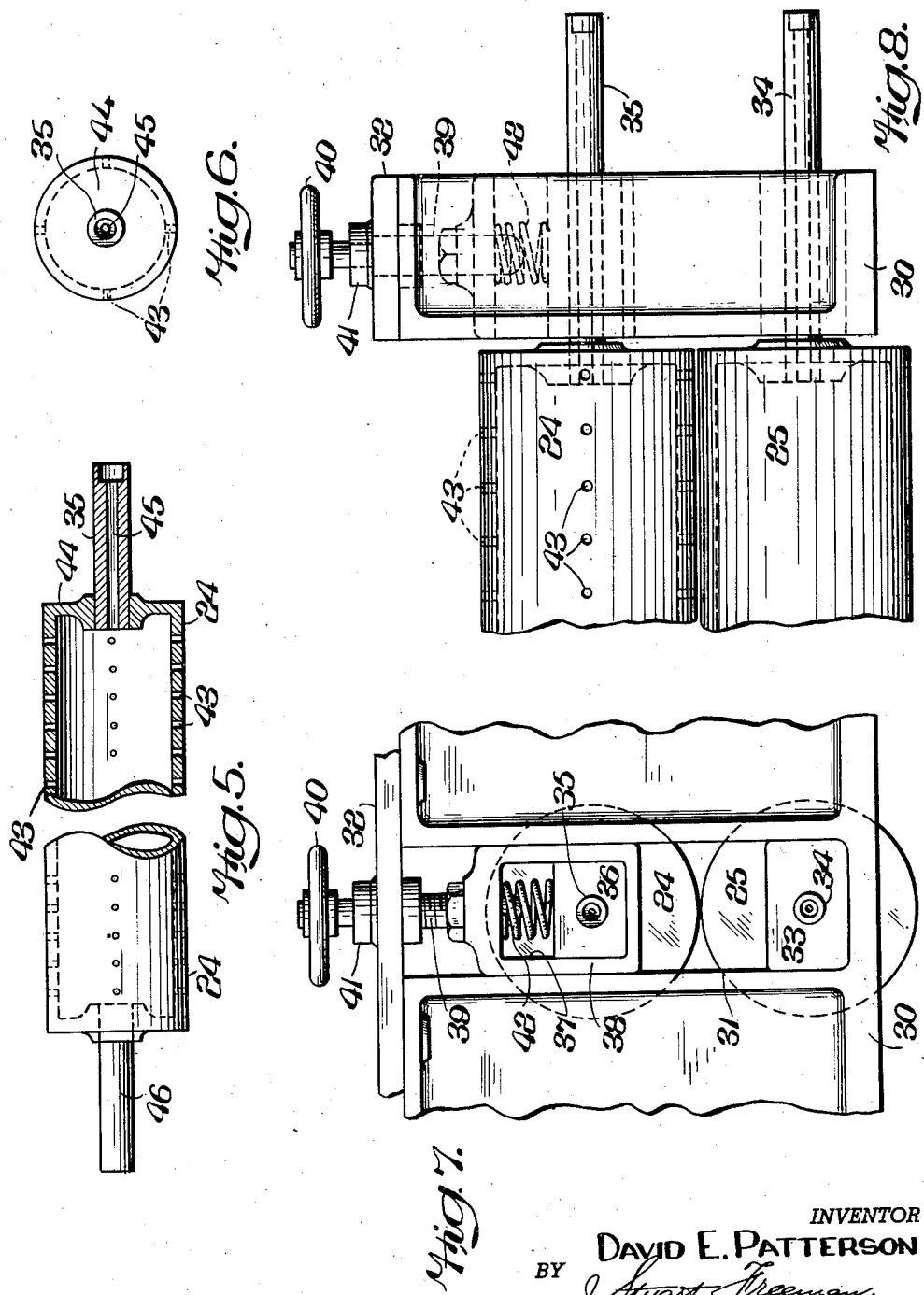

Patented Aug. 15, 1944

2,355,999

UNITED STATES PATENT OFFICE 2,355,999

PROCESS FOR DECORTICATING RAMIE AND OTHER BAST FIBERS

David E. Patterson, Philadelphia, Pa., assignor to Bast Fiber Development Corporation, New York, N. Y., a corporation of New York Original application February 20, 1941, Serial No. 379,834. Divided and this application July 23, 1941, Serial No. 403,597

2 Claims. (Cl. 19—6)

The object of the invention is to provide an improved process for the decortication of ramie and similar bast fibers, with references made to a machine adapted for carrying out said process, this application comprising a division of copending application, Serial No. 379,834, filed February 20, 1941.

Ramie, while with flax, hemp and jute constituting a bast fiber, possesses certain characteristics which require an essentially different treatment or process. Unlike flax, jute and hemp, which must be decorticated after the stalks have been first dried, ramie must be so treated while yet "green," that is, in its natural or "live" wet condition and as soon as possible after being cut. This haste that is so essential in treating ramie is due to the fact that almost immediately after it is cut, and especially if permitted to lie upon the ground or elsewhere for even a relatively few hours in a hot climate, fermentation sets in with the result that the fibers quickly deteriorate and soon become wholly unworthwhile reclaiming. Furthermore, due to the fact that when correctly treated ramie stalks still contain all of the live sap that characterizes the growing plant, the process involves the continuous cleansing of the treating machine, the broken stalks and the fibers of such sap, gums and possible other juices that tend to gather upon them, whereas with hemp, flax and jute no such condition is encountered in their prime dry condition.

Another and more specific object, therefore, is to provide a process which consists in first flattening and thereby breaking the stalk longitudinally, to initially break the bark along parallel lines and partially expose the internal structure of the stalk, then to break the bark transversely at spaced intervals, to further expose the internal structure and also loosen the hurds to facilitate their removal, then removal of the foliage, preferably in the direction of its growth by brushing or scraping, then removal of the broken outer bark as hurds by abrasion between a plurality of pairs of adjacent roll surfaces, said surfaces being slightly roughened, adjacent cooperating rolls being preferably run at different surface speeds, and the average speed of adjacent pairs of abrading surfaces gradually increasing towards the discharge end of the treating machine, after which the fibers pass between cleaning rolls before passing towards and being discharged upon a suitable conveyor belt or its equivalent.

Figure 2:
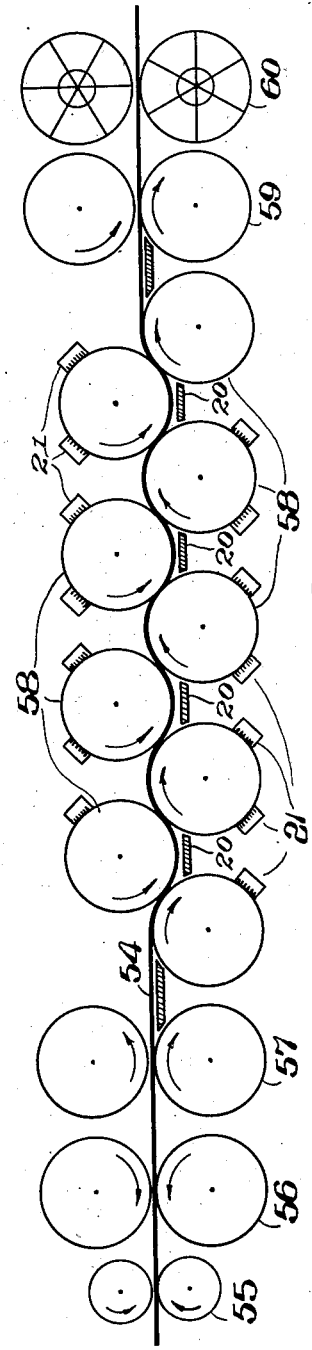

With the objects thus briefly stated, the improved process is best understood by reference to the machine which has been especially assigned to carry out said process, said machine comprising details of construction and operation, which are hereinafter fully brought out in the following description, when read in conjunction with the accompanying drawings, in which Fig. 1 is a diagrammatic view, showing the arrangement and relationship of the various elements that in the improved machine enter into the combination as breakers, feed rolls, abrasion rolls and cleaners; Fig. 2 is a similar view of a slightly modified arrangement of said elements for carrying out the improved process or method with the same general results; Fig. 3 is a much enlarged section through a stalk of ramie upon which bark has formed; Fig. 4 is an end elevation of a pair of improved breaker elements in operative cooperation with a section of stalk between them; Fig. 5 is a part elevation and part sectional view of one of the upper abrasion rolls; Fig. 6 is an end elevation of the same; Fig. 7 is an enlarged fragmentary elevational view, showing the ends of a pair of cooperating abrasion rolls and their respective mountings; Fig. 8 is an end elevation of the same; Fig. 9 is a fragmentary and elevational view of a representative group of four such rolls and the method by which they are driven at different predetermined speeds; and Fig. 10 is a fragmentary end elevation of the same.

Referring to the drawings, it should be first understood that ramie, one of the broad group of bast fibers, is initially a stalk of the general cross sectional make-up shown in Fig. 3. Commencing with the outer layer and proceeding inwardly, there is the external bark 1, which varies from a thin protective shell in the case of young stalks to a relatively much thicker and harder layer in the case of older stalks. Next we find the layer 2 of ramie fiber, which when finally separated from the other layers and cleaned becomes the "China grass" of commerce, that when prepared by this new machine and corresponding process is adapted for textiles, paper making and other uses, such as characterize flax, silk, rayon, cotton and the like. Next within this fiber is encountered the woody layer 3, within which is the centrally located pithy core 4 of alpha cellulose. From this group of several layers, the ramie must be separated, washed and degummed, and towards this end the outer bark and inner wood must be broken both longitudinally, along preferably four or more lines, and at substantially equally spaced intervals transversely. The leafy foliage is then removed by abrasion, as by the use of brushes and preferably in the same direction as that of the leaves' normal growth. From then on, the bark and cellulosic pith are removed from the fibers by abrasion, while during substantially all of this treatment the various rotatable elements and the fibers passing between them are subjected to a free flow of fresh water. This constant flushing of the rolls and fiber, together with the aid of the brushes (stationary or movable) in contact with the surfaces of said rolls, tends to free the rolls and fiber from the accumulation otherwise of the plant juices gums, which if not removed at once quickly dry and cake, thereby tending to defeat the efficient operation of the process, and impairing the quality of the finished ramie fiber.

Referring to Fig. 4, a pair of breaker rolls 5 and 6 are shown as being mounted upon parallel shafts 7 and 8. The first of these rolls comprises preferably three longitudinally extending ridges 9, the outer surfaces 10 of which are concentric, while said ridges are connected by concavely curved, wide, shallow grooves 11. The other roll comprises preferably three radially outwardly extending sectors 12, having concentric outer surfaces 12a which cooperate in such spaced relation with the curved surfaces 11 of said first roll as to flatten the ramie stalk 12b, and produce two oppositely directed, and at least one upper and one lower crack or longitudinal break in the bark of the stalk. Between each pair of adjacent sectors 12 is a groove 13, which cooperates in similarly spaced relation with the outer surface of one of the ridge surfaces 10 of said first roll, to likewise break the bark of the stalks between those regions that are broken by the sectors just described. For breaking both the outer bark and inner wood transversely and at spaced intervals, the stalks in passing between said breaker rolls are abruptly bent in the angular grooves 14, where the wider grooves 13 of the second roll meet the radially directed surfaces 15, which define both said last-mentioned grooves and the intervening sectors 12, and similarly at the angular intersections 16 of the ridges 9 with the adjacent curved surfaces 11 of the first roll. To a somewhat similar though possibly slightly less degree, the bark and inner wood of said stalks are also broken as they are bent across the angular ridges 17, formed upon the second roll at the junction of the said radial surfaces 15 with the outer curved surfaces 12a. However, during this continuous series of both longitudinal and transverse breaks in both bark and wood, the ramie fibers remain intact and unmarred, although the bond between them and the undesired hurds are loosened to such an extent that the latter may be fairly readily brushed and/or abraded from the former. Also, it is to be understood that instead of three ridges and intervening grooves upon each roll, any desired number may be employed; also any desired number of pairs of breaker rolls may be used.

Referring now to Fig. 1, the stalks having passed between the interlocking pair of breakers 5 and 6, then pass between the first pair of properly spaced abrading feed rolls 18 and 19, the surfaces of which are freed from miscellaneous litter from the broken stalks by means of scrapers 20 and brushes 21. These rolls positively feed the stalks toward and between a pair of rotatable brushes 22 and 23, which preferably revolve in the opposition direction to the direction of movement of the intervening stalks, but at a much higher speed than the breakers, so as to brush the leaves from said stalks in the same direction as that in which the leaves normally grow. From said brushes the stalks then pass between properly spaced pairs of abrading rolls 24 and 25, which are spaced apart specified distances, as hereinafter described, and which also rotate in the direction taken by the stalks being treated but at speeds, which differ between the rolls of each vertical pair and also between the average speeds of the rolls of consecutive pairs, while the surfaces of said rolls are milled or otherwise roughened. After leaving said abrading rolls, the remie fibers, which by now are free of most of their bark, wood and pith, are further propelled by another pair of feeder rolls 26, rotating at a still higher speed than that of any of said abrading rolls, so as to pass between a pair of cleaner elements 28 and 29, before falling upon a suitable conveyor 30, or equivalent means for transferring the resulting relatively clean fiber or "China grass" to the desired location for washing, degumming, rewashing, bleaching and/or such other operation as may be desired.

As hereinbefore mentioned, the abrading rolls of each pair herein described are spaced apart at predetermined distances. Referring to Figs. 7 and 8, a portion of one side of the frame of the improved machine is represented by a member 30, in which is provided a vertically extending slot 31, spanned at the top by a suitable plate or the like 32. Within the lower portion of said slot is a bearing block 33, through which is journalled the axially extending shaft 34 of one of the rolls 25, for instance, the position of said roll being fixed due to the inability of said bearing block to descend further than the lower limit of said slot. The upper roll 24 in this instance, is rotatably supported by its shaft 35, which is journalled in an upper bearing block 36, which is upwardly slidable within a recess 37 in an auxiliary block 38, the height of said last-named block being adjustably determined by a screw 39, the lower end of which is in threaded engagement with said auxiliary block, while its upper free end is provided with a wheel or the like 40, and its intermediate portion is in rotatable, longitudinally fixed engagement with a bushing 41 carried by the plate 32. Thus, the lowermost or normal position of the upper roll 24 is set at any desired distance from the lower roll 25, and in order that said upper roll may be free to yield upwardly upon encountering any unusual thickness of stalk material, a compression spring 42 is interposed between the upper bearing block 36 and the upper portion of said auxiliary block, so that the upper roll 24 is yieldingly maintained in the desired position.

As has been hereinbefore stated, it is desirable in treating ramie fibers to both keep the rolls clean and at the same time wash refuse materials from the fibers, as they are separated therefrom. In order to accomplish this, each upper roll of the abrading type is preferably hollow (see Fig. 5), and is provided at angularly spaced regions with longitudinally extending rows of discharge apertures 43, but which apertures may be arranged in accordance with any other desired pattern. The ends of each roll are closed by walls 44, through at least one of which extends the shaft 35 provided with an axial bore 45 for the purpose of conducting water (or other liquid, or gas for that matter) to the interior of said roll, the opposite end wall being provided with a shaft or trunnion 46 which is preferably solid.

As also hereinbefore referred to, the rolls of each vertical pair are rotated at different speeds with respect to each other, while the average speed of the two rolls of each such pair is different from that of the rolls of the next adjacent pairs. This may be accomplished in any desired manner, but for purposes of illustration and in the machine which comprises the preferred embodiment of the invention, a pair of vertically spaced horizontal shafts 47 and 48 are provided (see Figs. 9 and 10), and each shaft carries a series of bevel-gears in mesh with similar gears carried by the shafts 35 of the several breaker rolls, feed rolls, abrading rolls, etcetera. To illustrate, in Fig. 9 the two lower rolls 25 are provided with bevel-gears 49, which in this case are of the same size, and are in mesh with bevel-gears 50 carried by the shaft 48, so that both of the rolls 25 rotate (in the direction of their respective arrows) at the same speed, though some of the adjacent lower rolls rotate at different speeds by using gears having different ratios:

Returning to the instant example, the bevel gears 51, carried by the upper rolls 24, while of the same size as each other, are larger than the corresponding gears 49 carried by the lower rolls 25. At the same time, bevel-gears 52 and 53, carried by the upper shaft 47 and in mesh with said upper roll gears, are themselves of different sizes, with the result that each of the upper rolls rotates at a different speed from that of its lower roll, while said upper rolls also rotate at different speeds from each other. This speed relation is brought out more specifically by reference to Fig. 1, which shows one roll speed relationship that has been found to be very effective. In this set-up, which is cited as an example, both of the breakers run at 14 R. P. M.; the first set of abrading, feed rolls at the respective speeds of 8 and 36 R. P. M.; the pair of rotary brushes at 100 R. P. M. each; the first set of abrasion rolls at 16 and 50 R. P. M., respectively; the second set of these rolls at 28 and 75 R. P. M., respectively, and the third and last set of abrading rolls at 60 and 100, respectively; and the cleaner rolls both at 250 R. P. M.; while the conveyor is run at whatever speed may be necessary, such as 90 F. P. M., to carry off the separated fiber. Also, it will be appreciated that instead of the single stationary brush 21 which cooperates with each roll, any number of such brushes can be used, while they may be of whatever form and construction may be found most advantageous, even to the use of rotary brushes if preferred.

For a slightly modified arrangement of the several rolls, reference is made to Fig. 2, wherein the path taken by the stalk initially and in time by the separated fiber is shown by the heavy line 54. In this case the stalk first passes between a pair of flattening feed rolls 55, then between brushes 56, for removing the foliage, then between a second pair of feed rolls 57, following which it passes between a series of staggered abrading rolls 58, which may be considered roughly as comprising several groups of three rolls each. In such an arrangement, no matter at what speed any particular abrading roll is run, the speeds of adjacent cooperating rolls are always different and preferably higher, so that the surface speed of each roll is progressively greater than the speed at which first the stalk and in time the separated fibers pass each such roll. Finally, in this construction as in that first described, the fiber still in association with at least some of the refuse material passes between one or more pairs of high-speed cleaning rolls 60.

Summarizing the several steps of the process briefly, the leaves are first removed by brushing them in the direction of their growth is preference to against the direction of growth, in order to eliminate the possibility otherwise of injuring the ultimate condition of the separated ramie fibers. The stalks are flattened, so as to thereby break both the wood and whatever thickness of bark may be present, both upon the laterally opposite edges of said flattened stalk, and also substantially in the center of each flattened side. The spaces between vertically adjacent rolls is such that the stalks are only flattened, but not close enough to compress or tighten the bark about the fibers, as under too great a pressure the fibers are fractured by being pressed too firmly into the inner wood portion of the stalk. By transversely breaking the bark of the stalks, the bark is still further loosened from the fiber which lies immediately therebeneath, without injuring the latter. Besides acting as breakers, the rolls thus designated may be used as cleaners, and may be of any desired number and arrangement either at the entering end or the discharge end of the machine alone, or both at the entering and discharge ends of said machine. It should be noted at this point that consideration of the direction of rotation of the various rolls is predicated largely upon the fact, that it is preferable to feed the stalks into the machine butt first, especially as the ends of the stalks can be better aligned in that manner. The stalks, after passing the final set of feed rolls that control the already flattened and longitudinally broken, defoliaged stalks, with the outer bark at least substantially entirely removed and the bond broken between fibers, wood and whatever small pieces of bark may still remain, are then finally cleaned by the rapidly rotating cleaner rolls. Towards washing away the undesirable waste material, sufficient water is allowed to escape from the upper abrading rolls both to cleanse their own surfaces and to flow downwardly over the surface of the respective rolls beneath them.

Throughout the foregoing specification and in the appended claims, it is to be understood that all references to ramie specifically are to be considered as including and anticipating any and all bast and/or other fibers, which can be handled efficiently by the improved machine and process herein disclosed, such as for instance *Crotalaria junces*.

Having thus described my invention, what I claim and desire to protect by Letters Patent of the United States is:

1. The process of removing ramie fiber from its stalk, which consists in breaking both the outer bark and the inner woody layer of alternate lengthwise sections of a stalk longitudinally and breaking similar portions of intervening sectionts transversely, repeating the operation throughout the length of the stalk, and then separating the fiber from the bark and wood by means of abrasion.

2. The process of removing ramie fiber from its stalk, which consists in breaking both the outer bark and the inner woody layer of alternate lengthwise sections of a stalk longitudinally and breaking similar portions of intervening sections transversely, repeating the operation throughout the length of the stalk, removing the foliage in the direction of growth away from the butt end of the stalk, and then separating the fiber from the bark and wood by means of abrasion.

DAVID E. PATTERSON.